(12) United States Patent
Matsuyama

(10) Patent No.: US 6,336,518 B1
(45) Date of Patent: Jan. 8, 2002

(54) TRAVEL ASSISTING HYDRAULIC CIRCUIT FOR HYDRAULIC DRIVE TYPE WORKING VEHICLE

(75) Inventor: Nobuo Matsuyama, Sakado (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/323,934

(22) Filed: Jun. 2, 1999

(30) Foreign Application Priority Data

Jun. 11, 1998 (JP) .......................................... 10-181613

(51) Int. Cl.$^7$ .............................................. B60K 17/00
(52) U.S. Cl. ...................................... 180/306; 180/307
(58) Field of Search ................................ 180/305, 306, 180/307, 308, 242; 60/435, 484, 486, 487

(56) References Cited

U.S. PATENT DOCUMENTS

| | | | | |
|---|---|---|---|---|
| 4,776,233 A | * | 10/1988 | Kita et al. ...................... | 475/76 |
| 4,813,234 A | * | 3/1989 | Nikolaus ...................... | 60/484 |
| 4,886,142 A | * | 12/1989 | Yamaoka et al. ........... | 180/242 |
| 4,895,049 A | * | 1/1990 | Kita et al. ...................... | 475/76 |
| 4,991,672 A | * | 2/1991 | Leino ........................ | 180/14.3 |
| 5,159,992 A | | 11/1992 | Reinecke et al. | |
| 5,193,416 A | * | 3/1993 | Kanayama .................. | 74/733.1 |
| 5,335,750 A | * | 8/1994 | Geringer et al. ............ | 180/307 |
| 5,337,629 A | * | 8/1994 | Kita ............................ | 477/52 |
| 5,390,759 A | * | 2/1995 | Gollner ....................... | 180/307 |
| 5,709,282 A | * | 1/1998 | Akira et al. ................. | 180/307 |
| 5,887,674 A | * | 3/1999 | Gray, Jr. ...................... | 180/307 |
| 5,946,910 A | * | 9/1999 | Hayashi et al. ............... | 60/421 |

FOREIGN PATENT DOCUMENTS

| | | | | |
|---|---|---|---|---|
| DE | 3 409 566 A1 | | 9/1985 | |
| EP | 0 447 510 | * | 8/1993 | .................. 60/484 |
| JP | 9-32045 | | 2/1997 | |

* cited by examiner

Primary Examiner—Brian L. Johnson
Assistant Examiner—Bridget Avery
(74) Attorney, Agent, or Firm—Armstrong, Westerman, Hattori, McLeland & Naughton, LLP.

(57) ABSTRACT

A travel assisting hydraulic circuit for a hydraulic drive type working vehicle with enhanced general versatility, in which the traveling assisting circuit during travel at a high speed can be configured to be a simple circuit. For this purpose, in a hydraulic drive type working vehicle including a traveling HST circuit having a traveling pump driven by the power of an engine, and a traveling motor driven by the pressurized oil from the traveling pump, in which the output torque of the traveling motor is transmitted to a drive wheel via a speed reducer, the traveling assisting hydraulic circuit includes an assisting pump driven by the power of the engine, and an assisting motor for outputting the torque generated by being driven by the pressurized oil from the assisting pump to the speed reducer to add the torque to the output torque of the traveling motor.

10 Claims, 5 Drawing Sheets

TRAVEL ASSISTING HYDRAULIC CIRCUIT FOR HYDRAULIC DRIVE TYPE WORKING VEHICLE

TECHNICAL FIELD

The present invention relates to a travel assisting hydraulic circuit for a hydraulic drive type working vehicle, and the invention particularly relates to a travel assisting hydraulic circuit for a hydraulic drive type working vehicle equipped with a working machine, which travels by driving drive wheels by means of a hydraulic pump and a hydraulic motor driven by an engine.

BACKGROUND ART

Conventionally, a hydraulic drive type working vehicle (hereinafter simply referred to as a working vehicle), in which a traveling hydraulic pump (hereinafter referred to as a traveling pump) and a hydraulic pump (hereinafter referred to as an assisting pump) which is used for a purpose other than traveling (for example, driving a working machine) are driven by an engine is known. Such a vehicle travels by means of a hydraulic static transmission circuit (hereinafter called an HST circuit) which drives drive wheels by rotating a traveling motor with discharge pressurized oil of the traveling pump. Also, discharge pressurized oil of the assisting pump operates a working machine by extending and contracting a working cylinder, for example.

As an assisting hydraulic circuit for such a working vehicle, for example, a hydraulic circuit disclosed in Japanese Patent Laid-open No. 9-32045 is cited. According to the disclosure, in a hydraulic drive type working vehicle equipped with a traveling HST circuit and a working machine hydraulic circuit, a flow combining and dividing valve, which combines discharge oils from a traveling pump and a working machine hydraulic pump into one circuit, or divides them into each of their own circuits. By means of the flow combining and dividing valve, when the pressure of the traveling HST circuit is lower than a first predetermined pressure and the engine speed is higher than a predetermined value, the discharge oil from the working machine hydraulic circuit combines into the traveling HST circuit. On the other hand, when the pressure of the traveling HST circuit is higher than the first predetermined pressure, the discharge oil from the working machine hydraulic circuit is stopped from combining.

As a result, when the engine rotates at a higher speed and traveling load is lower, the discharge pressurized oil from the working machine hydraulic pump assists the traveling hydraulic motor, therefore rotating the traveling hydraulic motor at a speed higher than the rotating speed corresponding to the maximum discharge quantity of the traveling pump, and allowing the working vehicle to travel at a high speed.

However, the hydraulic circuit of the hydraulic drive type working vehicle disclosed in Japanese Patent Laid-open No. 9-32045 has the following disadvantages.

(1) The pressure of the traveling HST circuit and the pressure of the discharge oil added by the working machine hydraulic pump are the same, therefore requiring means for protecting the circuit of lower rated pressure. As a result, the configuration of the circuit is complicated, or effective assistance cannot be obtained since assistance can be provided only in the limited pressure range.

(2) Conventionally, a closed type (specifically, a circuit composed of a traveling pump and a traveling motor is basically a closed circuit), and an open type (specifically, the traveling pump and the traveling motor are connected via a change-over valve or the like, and the circuit composed of them is an open circuit) are used as a traveling HST circuit. Accordingly, it has been strongly desired that the travel assisting hydraulic circuit is made applicable to the aforesaid closed type traveling HST circuit. The hydraulic circuit disclosed in Japanese Patent Laid-open No. 9-32045, however, has the configuration only applicable to the open type.

(3) Normally, a traveling pump and a traveling motor of a large capacity are required in order to travel at a high speed. The traveling pump and the traveling motor of a large capacity, however, are larger in size, therefore making it difficult to decrease the entire size of the traveling HST circuit. In addition, a hydraulic pump and a hydraulic motor of capacity large enough to be capable of traveling at a high speed are less available, and further it is difficult to produce them, therefore causing the disadvantages of performance and cost, which makes them impractical.

SUMMARY OF THE INVENTION

Mitigating the aforesaid conventional disadvantages, an object of the present invention is to provide a traveling assisting hydraulic circuit for a hydraulic drive type working vehicle with more general versatility, in which a travel assisting circuit during travel at a high speed can be composed of a simple circuit with use of a hydraulic pump and a hydraulic motor of small size and capacity irrespective of the type of a traveling HST circuit (a closed circuit or an open circuit, or the number of pumps or motors).

In order to attain the aforesaid object, a travel assisting hydraulic circuit for a hydraulic drive type working vehicle according to the present invention is, in a hydraulic drive type working vehicle which includes a traveling HST circuit having a traveling pump driven by power of an engine and a traveling motor driven by pressurized oil from the traveling pump, with the output torque of the traveling motor being transmitted to a drive wheel via a speed reducer, characterized by including an assisting pump driven by the power of the engine, and an assisting motor for outputting torque generated by being driven by the pressurized oil from the assisting pump to the speed reducer to add the torque to the output torque of the traveling motor.

According to the above configuration, the traveling assisting hydraulic circuit, namely, the circuit of the assisting pump and the assisting motor, is constructed independently from the traveling HST circuit, therefore making the travel assisting hydraulic circuit applicable irrespective of the type of the traveling HST circuit (the numbers of hydraulic pumps and hydraulic motors, a type of circuit, and the like). Accordingly, the travel assisting hydraulic circuit is increased in general versatility, and commonality of the devices used is made possible. The rated pressure of the travel assisting hydraulic circuit is not influenced by the pressure value of the traveling HST circuit, therefore simplifying the configuration of the travel assisting hydraulic circuit, and enabling to assist in providing torque in the entire higher speed range of the working vehicle. Further, the hydraulic pump and the hydraulic motor of a small size and capacity can be used in the traveling HST circuit and the travel assisting hydraulic circuit, thus easily decreasing the size of the entire apparatus and achieving commonality of the devices used.

Further, the traveling HST circuit may be an open circuit or a closed circuit. According to the configuration, the travel assisting hydraulic circuit is applied to all hydraulic drive type working vehicles in which the traveling HST circuit is composed of an open circuit or a closed circuit, therefore enabling to construct the travel assisting hydraulic circuit increased in general versatility.

Furthermore, during inertia traveling, or while a brake is operated, the assisting motor may be used as an energy regenerating pump. Conventionally in general, while the vehicle travels by inertia, or while a brake device is operated, kinetic energy during traveling, which the vehicle itself has, is consumed by producing heat for braking. On the other hand, according to the present configuration, while the vehicle travels by inertia on a downward slope, or while the brake is operated, the assisting motor works as a regenerative pump. The discharge pressurized oil during regeneration is stored in an accumulator with the assisting motor, thereby making it possible to use the stored energy as a hydraulic source for the other devices, and therefore an energy-saving working vehicle can be constructed.

Further, the assisting pump and the assisting motor are either a fixed displacement type or a variable displacement type. According to the configuration, types of the assisting pump and the assisting motor have no limitation, therefore making it possible to construct a travel assisting hydraulic circuit increased in general versatility, Consequently, when the assisting pump is a variable displacement type, a fixed displacement type of assisting motor is used, and when the assisting pump is a fixed displacement type, a variable displacement type of assisting motor is used, thereby simplifying the configuration of the travel assisting hydraulic circuit and facilitating the control. In this way, the assisting motor can be selected according to the type of the assisting pump. Furthermore, the types of the assisting pump and the assisting motor can be selected according to the purpose of the assisting motor, therefore eliminating restriction in selecting the devices.

The travel assisting hydraulic circuit for the hydraulic drive type working vehicle characterized by further including steering cylinder for driving steering, and a steering pump for supplying pressurized oil to the steering cylinder, with the assisting motor being used as an alternative to the steering pump either when the engine stops, or when the steering pump is out of order.

Conventionally, in general, when the engine or the steering pump is out of order, pressurized oil is stopped from being supplied to the steering cylinder, thereby making the steering operation impossible. As a result, the operability is greatly decreased when the working vehicle is towed to move. On the other hand, according to the present configuration, the assisting motor works as an alternative to the steering pump under emergency conditions by towing or pushing the working vehicle. Accordingly, even when the engine stops, or the steering pump is out of order, the steering operation of the working vehicle becomes possible, thereby increasing steering operability under emergency conditions. In addition, it is not necessary to specially provide a steering pump used under emergency conditions (a so-called emergency steering pump), therefore simplifying the circuit configuration and decreasing the cost.

Furthermore, the travel assisting hydraulic circuit for the hydraulic drive type working vehicle may include
- a vehicle speed detector for detecting the rotational frequency of the drive wheel as a vehicle speed,
- a hydraulic detector for detecting the circuit pressure of the assisting motor,
- an engine speed detector for detecting an engine speed of the engine, and
- a controller, and
- the controller may obtain target circuit pressure relative to the detected engine speed of the engine when the detected vehicle speed is not lower than a predetermined assistance starting vehicle speed, and control an assisting quantity of the assisting motor so that the detected circuit pressure is equal to the target circuit pressure.

According to the above configuration, as an operating condition of the assisting pump and the assisting motor, a vehicle speed at which assistance is started, the pressure of the travel assisting hydraulic circuit, the engine speed, and the like are previously set, thereby the operation of the travel assisting hydraulic circuit can be automatically controlled in response to the traveling condition of the vehicle, Thus it becomes possible to travel at a speed much higher than when traveling only with the traveling HST circuit, during traveling at high speed without complicated operations by an operator.

BEST MODE FOR CARRYING OUT THE INVENTION

Preferred embodiments of the present invention will be described in detail below with reference to the drawings.

Figure 1:
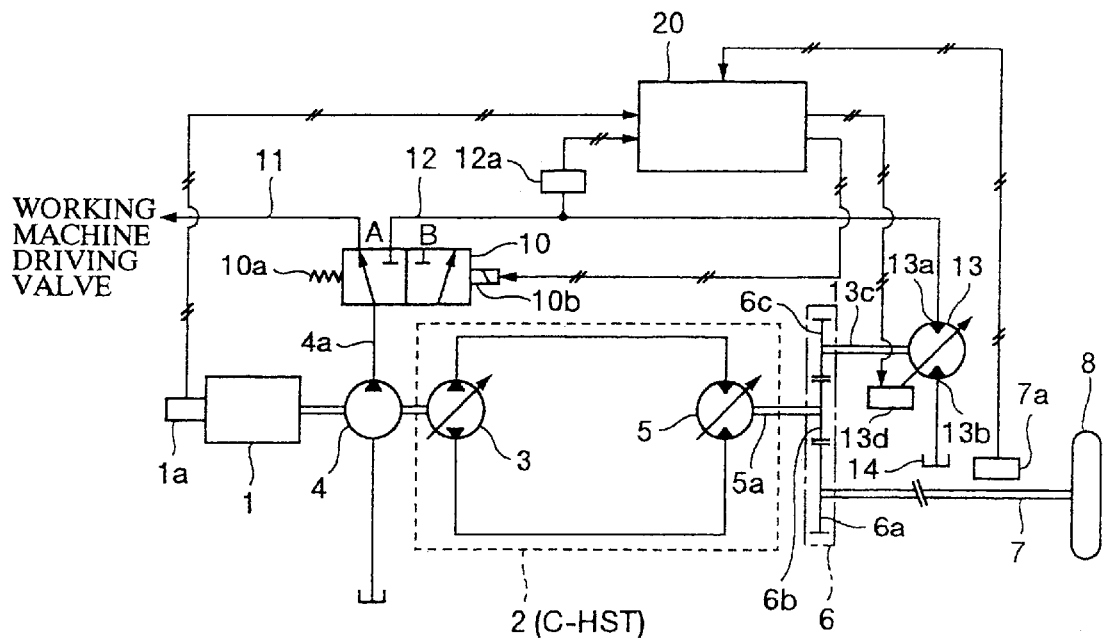
FIG. 1 is a schematic circuit diagram of an example of a travel assisting hydraulic circuit according to a first embodiment of the present invention.

First, a first embodiment will be explained based on FIG.1 to FIG. 8. In FIG. 1, an engine 1 drives a traveling pump 3 of a traveling HST circuit 2, and an assisting pump 4 used for the purposes other than traveling. In the present embodiment, the traveling pump 3 is a variable displacement type hydraulic pump, and the assisting pump 4 is a fixed displacement type hydraulic pump. The assisting pump 4 is also used as a working machine pump. The traveling HST circuit 2 is composed of a closed circuit in the embodiment, and the traveling pump 3 and a traveling drive motor 5 (hereinafter called a traveling motor 5) composed of a variable displacement type hydraulic motor are connected with a closed circuit. The closed type traveling HST circuit 2 is called a C-HST circuit hereinafter.

An output shaft 5a of the traveling motor 5 is connected to an input gear 6b on one side of a speed reducer 6, while an output gear 6a of the speed reducer 6 is coupled to a drive wheel 8 via a driving shaft 7. A controller 20 appropriately controls the capacities of the traveling pump 3 and the traveling motor 5 via a control valve (not illustrated) according to a predetermined algorithm, changing the rotational frequency of the traveling motor 5 to drive the drive wheel 8, thereby traveling a working vehicle at a desired speed. The engine 1 is provided with an engine speed detector 1a, and the driving shaft 7 is provided with a vehicle speed detector 7a. Detection signals from these detectors are inputted into the controller 20. The engine speed detector 1a and the vehicle speed detector 7a can be composed of a pulse generator, an encoder, or the like.

A discharge passage 4a of the assisting pump 4 is connected to an assistance selection valve 10. The assistance selection valve 10 is normally held at an A position with a spring 10a, and supplies the discharge pressurized oil of the discharge passage 4a to a working machine conduit line 11. A solenoid operating element 10b of the assistance selection valve 10 is connected to the controller 20. On receiving an operation command from the controller 20, the assistance selection valve 10 is switched to a B position, and supplies the discharge pressurized oil of the discharge passage 4a to an assisting conduit line 12.

The assisting conduit line 12 is connected to an input port 13a of a variable displacement type of assisting motor 13, and an output port 13b of the assisting motor 13 is connected to a tank 14. An output shaft 13c of the assisting motor 13 is connected to an input gear 6c of the other side of the speed reducer 6. The assisting conduit line 12 is provided with a hydraulic detector 12a, and a detection signal therefrom is inputted into the controller 20. A tilting rotative actuator 13d for controlling the capacity by changing a swash plate angle, for example, is coupled to the variable displacement type assisting motor 13, and inputs an operation command from the controller 20.

The controller 20 is mainly composed of a computer system having a microcomputer and the like. The controller 20 inputs each of detection signals from the engine speed detector 1a, the vehicle speed detector 7a, and the hydraulic detector 12a, then performs a predetermined computation (the details of which will be described later), and outputs operation commands respectively to the operating element 10b of the assistance selection valve 10, and the tilting rotative actuator 13d of the assisting motor 13.

Figure 2:
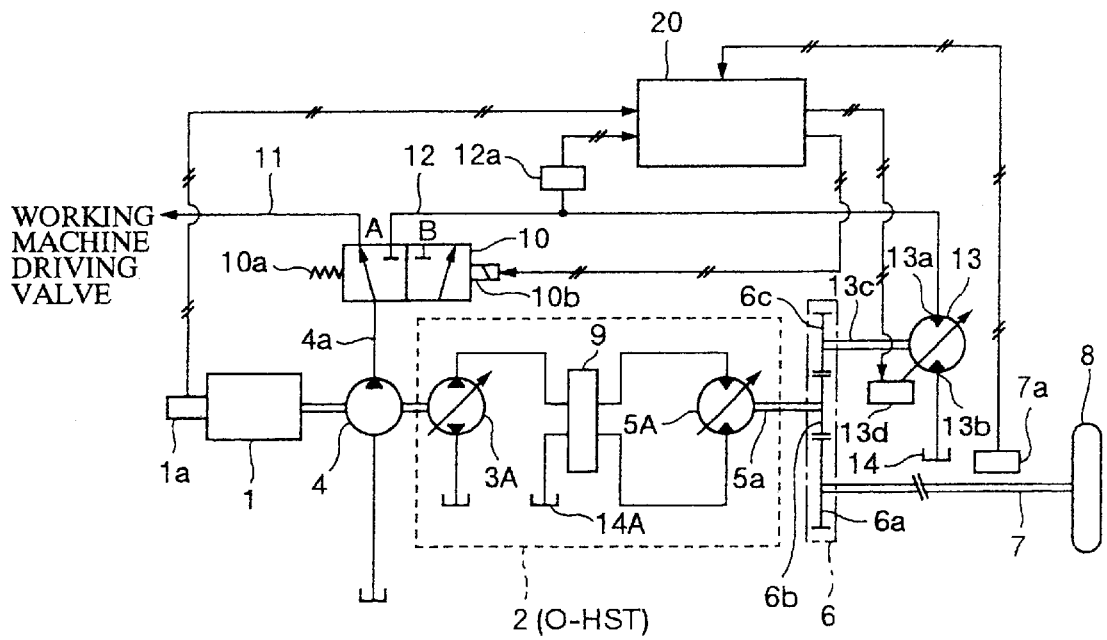
FIG. 2 shows the travel assisting hydraulic circuit according to the first embodiment of the present invention, and an example in which an open circuit is applied as the traveling HST circuit.

FIG. 2 shows another example in which the traveling HST circuit 2 (the portion enclosed by the dotted line in FIG. 1) is composed of an open circuit (referred to as an O-HST circuit hereinafter). In FIG. 2, a variable displacement type traveling pump 3A and a variable displacement type traveling motor 5A are connected with the open circuit via an advancing/reversing switching valve 9 and a tank 14A. The traveling pump 3A is driven by the engine 1, and the traveling motor 5A is connected to the input gear 6b of the speed reducer 6. Specifically, the O-HST circuit in this example is applied instead of the C-HST circuit in FIG. 1. Accordingly, the controlling method of the assisting pump 4 and the assisting motor 13 in the traveling assisting circuit according to the invention is the same as that in the C-HST circuit in FIG. 1. The explanation of a case where they are applied to the C-HST circuit is made below.

Next, the operation of the travel assisting circuit will be explained based on FIG. 3 to FIG. 8. The present invention assists traveling by respectively controlling the assisting pump 4, the assisting motor 13, and the assistance selecting valve 10 to enable high speed traveling, when the vehicle speed reaches a value not less than a predetermined value in a situation in which the vehicle travels, using only the aforesaid traveling HST circuit 2 (the C-HST circuit, or the O-HST circuit).

Figure 3:
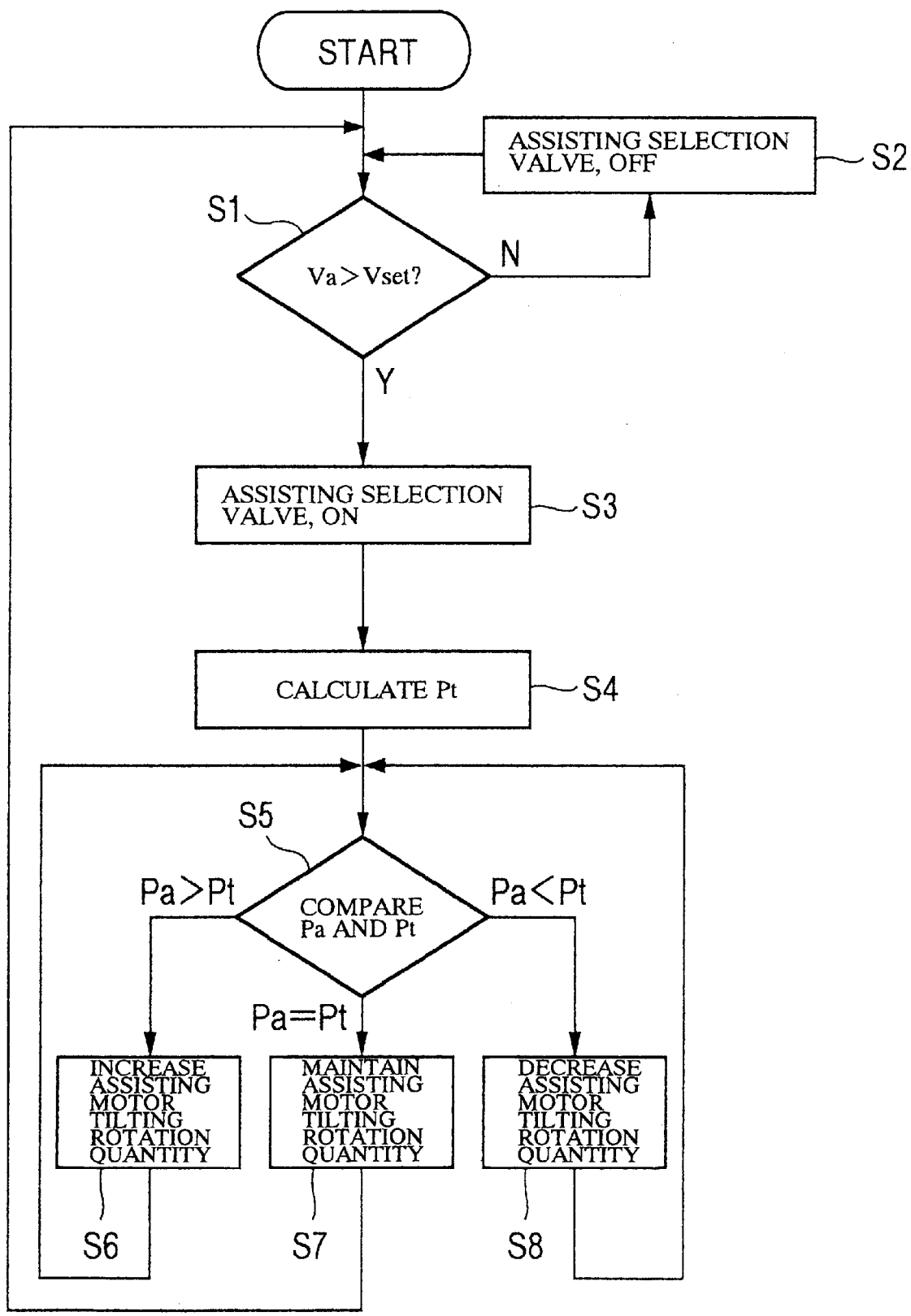
FIG. 3 shows an example of a flowchart of control processing of the travel assisting hydraulic circuit according to the first embodiment of the present invention.

FIG. 3 is an example of a flowchart of the control process of the controller 20, and the operation will be explained with reference to FIG. 3. Here, a vehicle speed Va represents an actual vehicle speed detected by the vehicle speed detector 7a, an assistance starting vehicle speed Vset represents a previously set vehicle speed at which the assistance is started, an engine speed Ne represents an engine speed detected by the engine speed detector 1a. Further, a target circuit pressure Pt represents a predetermined target circuit pressure in controlling the assisting circuit, an actual circuit pressure Pa an assisting circuit pressure detected by the hydraulic detector 12a, and an assisting quantity qm a capacity of the assisting motor 13.

In step S1, the controller 20 determines whether the vehicle speed Va is higher than the assistance starting vehicle speed Vset. When the vehicle speed Va is not higher than the assistance starting vehicle speed Vset, an off command is outputted to the solenoid operating element 10b so as to maintain an off state of the assistance selection valve 10, namely, the position A in Step 2. As a result, the discharge pressurized oil from the assisting pump 4 is supplied to the working machine cylinder and the like via the working machine conduit line 11 to enable to drive the working machine. In step S1, when the vehicle speed Va is higher than the assistance starting vehicle speed Vset, an on command is outputted to the assistance selection valve 10 in step S3. As a result, the discharge pressurized oil of the assisting pump 4 is supplied to the assisting motor 13 via the assisting conduit line 12. In this situation, the energy, which is consumed by a change-over valve (not shown) for driving the working machine cylinder, is not consumed any more, thus increasing energy efficiency. The assistance starting vehicle speed Vset is shown by the lower limit value in a vehicle speed range in which it is normally determined that the working machine or the like is not used.

Figure 4:
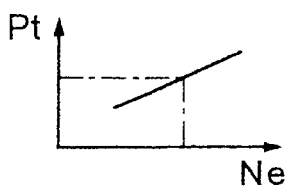
FIG. 4 is an example of relationship between an engine speed Ne and target circuit pressure Pt according to the first embodiment of the present invention.

Subsequently, in step S4, the target circuit pressure Pt to the engine speed Ne is read from a target circuit pressure table which is previously stored in a predetermined memory area in the controller 20. The target circuit pressure table is set to determine allowable output horse power of the assisting motor 13, and as shown in FIG. 4, for example, the target circuit pressure Pt to the engine speed Ne is stored as data of a predetermined function.

Next, in step S5, the actual circuit pressure Pa and the target circuit pressure Pt are compared with each other. As a result of the comparison, when the actual circuit pressure Pa is larger than the target circuit pressure Pt, a signal to increase an amount of tilting rotation of the assisting motor 13 is outputted to the tilting rotative actuator 13d to reduce the actual circuit pressure Pa in step S6, and a command is given to return to step S5. When the actual circuit pressure Pa is smaller than the target circuit pressure Pt, a signal to decrease a quantity of tilting rotation of the assisting motor 13 is outputted to increase the actual circuit pressure Pa in step S8, and a command is given to return to step S5. Thus, in steps S5, S6, and S8, the above processes are repeated until the actual circuit pressure Pa is equal to the target circuit pressure Pt. When the actual circuit pressure Pa is equal to the target circuit pressure Pt, a signal to maintain the present quantity of tilting rotation of the assisting motor 13 is outputted to maintain the actual circuit pressure Pa in step S7, and thereafter a command is given to return to step S1 to repeat the above processes.

Figure 5:
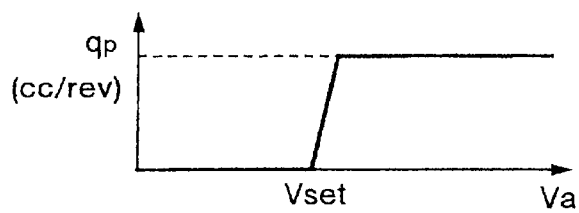
FIG. 5 shows relationship between a vehicle speed Va and a capacity qp of an assisting pump according to the first embodiment of the present invention.
Figure 6:
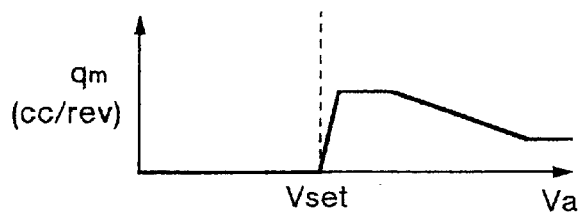
FIG. 6 shows relationship between the vehicle speed Va and an assisting quantity qm of an assisting motor according to the first embodiment of the present invention.

As a result of the processes in step S5 to step S8, the assisting quantity qm (cc/rev) of the assisting motor 13 is determined, and the output torque from the assisting motor 13 corresponding thereto is added to the output torque of the traveling HST circuit 2 via the speed reducer 6. The resultant torque to which the assistance is added is transmitted to the drive wheel 8, matching the traveling load, and the working vehicle travels at the predetermined vehicle speed Va. FIG. 5 and FIG. 6 respectively show examples of control curves of the capacity qp (cc/rev) of the assisting pump 4 relative to the vehicle speed Va, and assisting quantity qm of the assisting motor 13.

Figure 7:
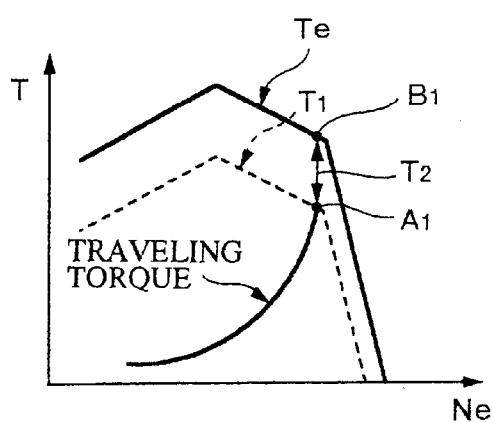
FIG. 7 shows relationship between the engine speed Ne and each torque T according to the first embodiment of the present invention.

Here, a production method of the aforesaid target circuit pressure table will be explained. FIG. 7 shows the magnitude of each torque T relative to the engine speed Ne in the engine 1. As shown in FIG. 7, an engine torque Te is divided into an HST torque T1 by the traveling HST circuit 2 and an assisting toque T2 by the assisting circuit, but when the vehicle only travels, the assisting torque T2 is not used and stays as excess torque. The travel assisting hydraulic circuit of the present invention utilizes the excess torque for the assisting circuit (specifically, the circuit of the assisting conduit line 12 and the assisting motor 13). When traveling only by means of the traveling HST circuit 2, the engine 1 matches the load with the torque at a point A1, and when operating the assisting circuit, the engine 1 matches the load with torque at a point B1. Based on the assisting torque T2 at this time, in consideration of the capacity qp of the assisting pump 4, the target circuit pressure Pt relative to the engine speed Ne is set as shown in FIG. 4, for example, to produce table data.

In the present embodiment, the target circuit pressure Pt is obtained from the table, but the present invention is not limited thereto, and the target circuit pressure Pt may be obtained based on a predetermined functional expression showing the target circuit pressure Pt relative to the engine speed Ne.

Figure 8:
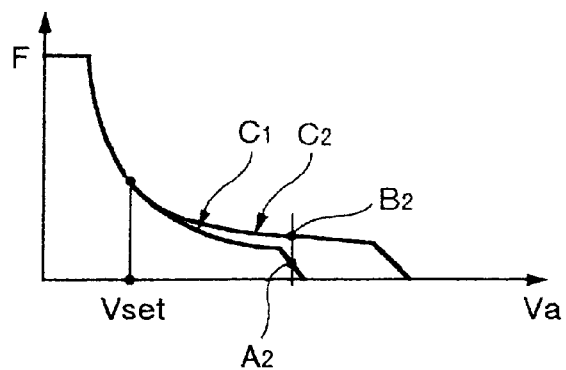
FIG. 8 shows traveling performance by the travel assisting hydraulic circuit according to the first embodiment of the present invention.

FIG. 8 shows traveling performance obtained by the assisting circuit, namely, a driving force F relative to the vehicle speed Va. In FIG. 8, a curved line C1 shows a case without assistance (specifically, when traveling only with the traveling HST circuit 2), and a curved line C2 shows a case with assistance (specifically, when the assisting circuit is operated). Specifically, when traveling according to the curved line C1, if the vehicle speed Va is not lower than the assistance starting vehicle speed Vset, the assisting circuit is operated as described above, thereby shifting the traveling performance to the curved line C2 and enabling to travel according to the curved line C2. In this situation, the points A1 and B1 in FIG. 7 respectively corresponds to matching points A2 and B2 in FIG. 8, and thus almost all the output torque from the engine 1 can be utilized for traveling. Accordingly, the excess driving force F occurs, therefore enabling to travel at a speed further higher than the vehicle speed Va corresponding to the point A2.

According to the aforesaid first embodiment, the hydraulic circuit for performing assistance in traveling is formed independently from the traveling HST circuit 2, and assists in providing torque via the speed reducer 6. Accordingly, the travel assisting hydraulic circuit is also applicable to a case in which the traveling HST circuit 2 is an O-HST circuit, or a C-HST circuit, therefore increasing general versatility. In addition, the assisting pump 4 is a fixed displacement type, and the assisting motor 13 is a variable displacement type, therefore simplifying the configuration of the circuit. Further it is suitable to control the only one of the above, that is a variable displacement type, therefore facilitating the control process. Generally, the working machine pumps of working vehicles are fixed displacement types, therefore being applicable to most of the working vehicles, and increasing in general versatility.

Further, instead of using the traveling pump 3 or the traveling motor 5, which is larger in size and capacity, a combination of the traveling pump 3, the traveling motor 5, the assisting pump 4, and the assisting motor 13, which are small in size and capacity, is used, thereby obtaining sufficient driving force and engine speed in a higher speed range, and facilitating to travel at a high speed. As a result, reduction in size of the entire apparatus and commonality of devices are achieved.

The operation of the travel assisting hydraulic circuit is automatically controlled by the controller 20. When the vehicle speed becomes higher, exceeding the predetermined vehicle speed Va previously set (the assistance starting vehicle speed Vset), the hydraulic pump which is not used, such as the working machine pump, for example, is used as the assisting pump 4 to drive the assisting motor 13. Subsequently, based on the pressure of the travel assisting hydraulic circuit, engine speed, and the like, the torque and the rotational frequencies of the assisting motor 13 are controlled, therefore facilitating to drive without necessity of a complicated operation by an operator. In addition, it is further possible to travel at a speed higher than when traveling only with the traveling HST circuit 2.

In the first embodiment, shown is an example in which the assisting pump 4 is composed of a fixed displacement type, and the assisting motor 13 is composed of a variable displacement type. The present invention, however, is not limited to the above combination, and the assisting pump 4 and the assisting motor 13 may be any one of a fixed displacement type and a variable displacement type. In this case, if either one of the assisting pump 4 or the assisting motor 13 is a variable displacement type, the rotational frequency of the assisting motor can be controlled and the control process is facilitated. If the assisting motor 13 is a fixed displacement type, when the assistance selection valve 10 is off and the assisting circuit is not operated, the assisting motor 13 is rotated by the rotational torque of the traveling motor 5, therefore it is necessary to provide, for example, a bypass circuit to the tank 14 in the assisting conduit line 12 so that the assisting motor 13 has no load during rotation. Incidentally, when the assisting motor 13 is a variable displacement type, it is suitable to set the capacity at 0.

Further, even if the traveling HST circuit 2 is composed by a plurality of traveling pumps 3 and traveling motors 5, the assisting motor 13 according to the present invention are coupled to the traveling motors 5 via the speed reducer, thereby easily applying the travel assisting hydraulic circuit, and enhancing versatility.

Next, a second embodiment will be explained with reference to FIG. 9. The second embodiment shows an example in which the assisting motor 13 in the first embodiment is also used as an emergency steering pump which is used as an alternative to a steering pump under emergency conditions.

Figure 9:
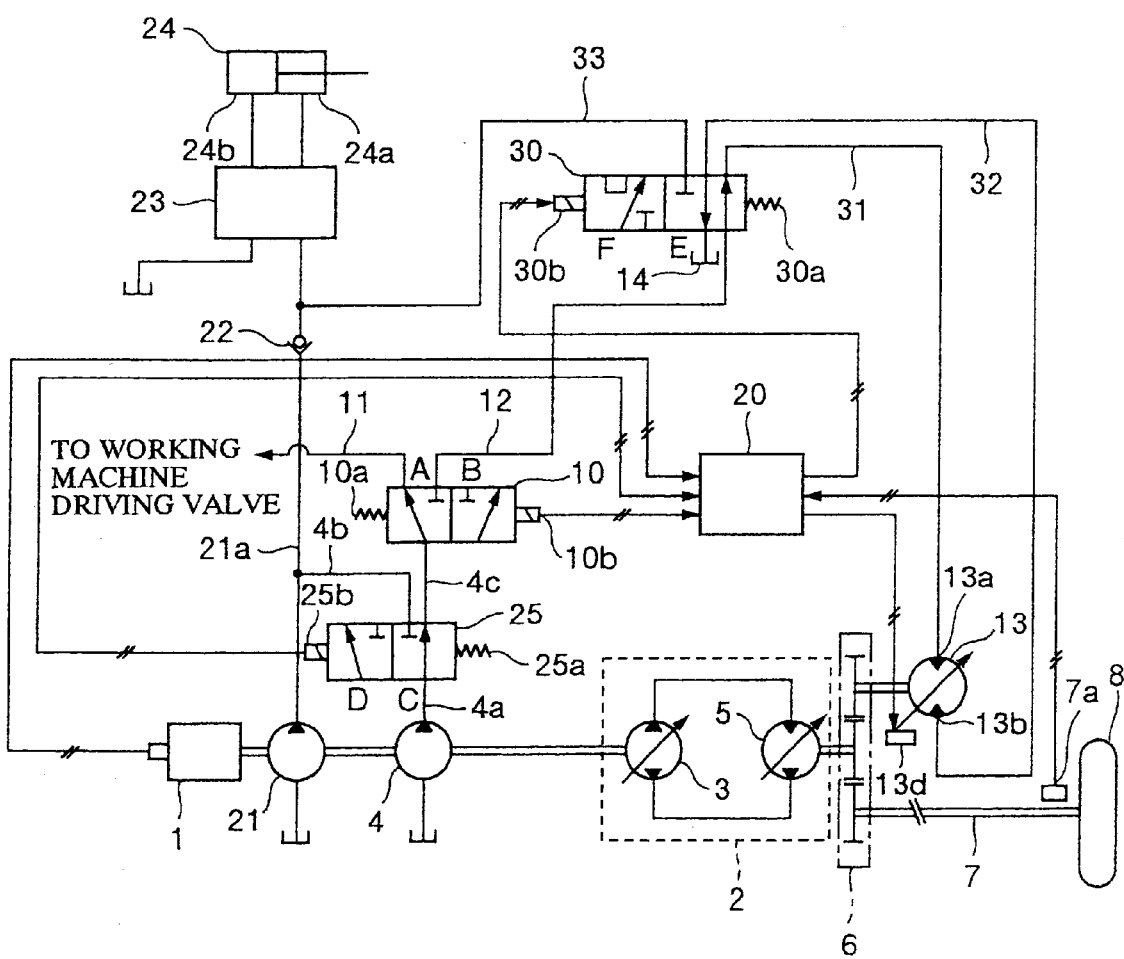
FIG. 9 is a schematic circuit diagram of an example of a travel assisting hydraulic circuit according to a second embodiment of the present invention.

In FIG. 9, an engine 1 drives a fixed displacement type steering pump 21, a fixed displacement type assisting pump 4 (in this example, also used as a working machine pump), and a variable displacement type traveling pump 3. A discharge passage 21a of the steering pump 21 is connected to a steering valve 23 consisting of a change-over valve via a check valve 22. The steering valve 23 is a change-over valve configured to output pressurized oil at a flow rate almost proportional to an amount of operation of a steering operation means (not shown) such as a steering wheel, and the outputted pressurized oil is supplied to a head chamber 24a or a bottom chamber 24b of a steering cylinder 24 for driving steering.

A discharge passage 4a of the assisting pump 4 is connected to an input port of a priority valve 25. The priority valve 25 is normally held at a C position by means of a spring 25a, and the discharge passage 4a is connected to an assistance selection valve 10 via a conduit line 4c. An operating element 25b of the priority valve 25 is connected to the controller 20. When an operation command is inputted to the operating element 25b from the controller 20, the position of the priority valve 25 is switched to a D position, and the discharge passage 4a is connected to the steering valve 23 via the conduit line 4b and the discharge passage 21a.

The assistance selection valve 10 is normally held at an A position by means of a spring 10a, and the conduit line 4c is connected to a working machine conduit line 11. The operating element 10b of the assistance selection valve 10 is connected to the controller 20, and when an operation command is outputted from the controller 20, the assistance selection valve 10 is switched to a B position, and the conduit line 4c is communicated with an assisting conduit line 12. The assisting conduit line 12 is connected to an emergency steering valve 30 (referred to as an emergency valve hereinafter) consisting of a change-over valve for driving steering under emergency conditions.

The emergency valve 30 is normally held at an E position by means of a spring 30a. Thereby, the assisting conduit line 12 is connected to an input port 13a of an assisting motor 13 via a conduit line 31, and an output port 13b of the assisting motor 13 is connected to a tank 14 via a conduit line 32 and the E position of the emergency valve 30. An operating element 30b of the emergency valve 30 is connected to the controller 20. When an operation command from the controller 20 is inputted into the operating element 30b, the emergency valve 30 is switched at an F position, the assisting conduit line 12 is cut off, and the input port 13a of the assisting motor 13 is connected to the tank 14 via the conduit line 31. At the same time, the output port 13b of the assisting motor 13 is connected to a portion between the check valve 22 and the steering valve 23 via the conduit line 32, the emergency valve 30, and an emergency steering conduit line 33 (referred to as an emergency conduit line hereinafter).

Next, the operation will be explained with reference to FIG. 9. Generally, when the speed of the engine 1 is in a lower range, the discharge quantity of the steering pump 21 is small, therefore causing such a case as a quantity flowing into the steering cylinder 24 becomes insufficient to thereby reduce the steering operability. In such a situation, an operation command is outputted to the operating element 25b of the priority valve 25 from the controller 20, the priority valve 25 is switched to the D position, and the discharge passage 4a is connected to the discharge passage 21a, thereby adding the discharge quantity of the assisting pump 4 to the discharge quantity of the steering pump 21. Accordingly, a flow rate of pressurized oil sufficient for driving steering is supplied to the steering cylinder 24, thus increasing steering operability in a lower speed range.

When the speed of the engine 1 reaches a value not less than a predetermined value, an off command is outputted to the operating element 25b of the priority valve 25 to return the priority valve 25 to the C position. In this situation, if the vehicle speed Va is not higher than the predetermined assistance starting vehicle speed Vset, an off command is inputted to the operating element 10b of the assistance selection valve 10, and the assistance selection valve 10 is held at the A position. As a result, the discharge pressurized oil of the assisting pump 4 is supplied to a working machine driving valve (not shown) via the conduit line 4c and the working machine conduit line 11. If the vehicle speed Va exceeds the assistance starting vehicle speed Vset, an operation command is inputted into the operating element 10b from the controller 20 to thereby switch the assistance selection valve 10 to the B position. As a result of switching, the discharge pressurized oil of the assisting pump 4 is supplied to the emergency valve 30 via the conduit line 4c and the assisting conduit line 12.

When the engine 1 or the steering pump 21 is not out of order, an off command is outputted to the operating element 30b of the emergency valve 30 from the controller 20, and the discharge pressurized oil from the assisting pump 4 flows into the assisting motor 13 via the conduit line 31 to thereby rotate the assisting motor 13. Thereby, as in the first embodiment, the output torque of the assisting motor 13 is added to the output torque of the traveling motor 5 via the speed reducer 6, thus enabling to travel at a speed higher than when traveling with only the traveling motor 5.

When the engine 1 or the steering pump 21 is out of order, an operation command is outputted to the operating element 30b of the emergency valve 30 from the controller 20 to switch the emergency valve 30 to the F position. Thereby, the assisting conduit line 12 is cut off, the input port 13a of the assisting motor 13 is connected to the tank 14 via the conduit line 31, and the output port 13b of the assisting motor 13 is connected to the steering valve 23 downstream from the check valve 22 via the conduit line 32 and the emergency conduit line 33.

In this situation, when the working vehicle is towed or pushed, the rotation of a drive wheel 8 drives a driving shaft 7, thereby driving the assisting motor 13 via the speed reducer 6. The assisting motor 13 then works as a pump, absorbs tank oil from the input port 13a via the tank 14, the emergency valve 30, and the conduit line 31, and discharges pressurized oil from the output port 13b. The discharge pressurized oil is supplied to the steering valve 23 via the conduit line 32, the emergency valve 30, and the emergency conduit line 33. Accordingly, even under emergency conditions, steering operation can be performed. The aforesaid discharge pressurized oil is stopped from flowing into the steering pump 21 by means of the check valve 22.

As in the above, according to the second embodiment, when the vehicle speed Va exceeds the assistance starting vehicle speed Vset, the discharge pressurized oil from the assisting pump 4 is supplied to the assisting motor 13 to add the output torque of the assisting motor 13 to the traveling motor 5, therefore enabling to travel at a higher speed. In this situation, even if the engine 1 or the steering pump 21 is out of order, the assisting motor 13 is operated as a pump, and the discharge oil of the pump (specifically, the assisting motor 13) can be supplied to the steering valve 23 by switching the emergency valve 30 to drive the steering cylinder 24, therefore facilitating a steering operation under emergency conditions.

Figure 10:
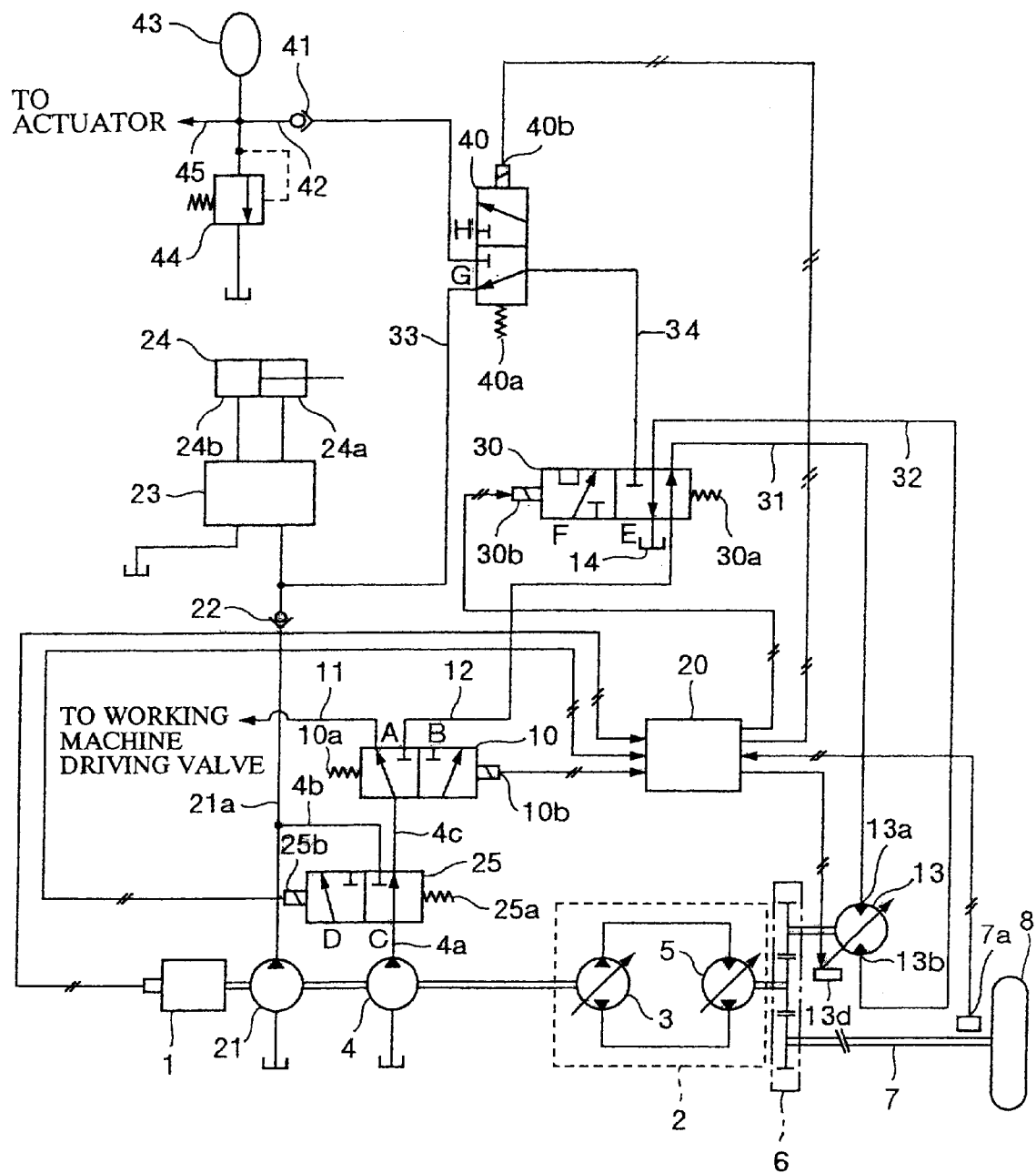
FIG. 10 is a schematic circuit diagram of an example of a travel assisting hydraulic circuit according to a third embodiment of the present invention.

Next, a third embodiment will be explained based on FIG. 10. The third embodiment shows an example in which the assisting motor 13 in the second embodiment is used as an energy regenerating pump. In FIG. 10, an emergency valve 30 is normally held at an E position by means of a spring 30a. Thereby an assisting conduit line 12 is connected to an input port 13a of an assisting motor 13 via a conduit line 31, and an output port 13b of the assisting motor 13 is connected to a tank 14 via a conduit line 32 and the E position of the emergency valve 30. When an operation command from a controller 20 is inputted into an operating element 30b, the emergency valve 30 is switched to an F position, thus cutting off the assisting conduit line 12. At the same time, the output port 13b of the assisting motor 13 is connected to an accumulator valve 40 via the conduit line 32, the emergency valve 30, and a conduit line 34.

The accumulator valve 40 is normally held at a G position by means of a spring 40a. In this situation, the conduit line 34 is communicated with a portion between a check valve 22 and a steering valve 23 via an emergency conduit line 33. When an operation command is inputted into an operating clement 40b from the controller 20, the accumulator valve 40 is at an H position, and thereby the conduit line 34 is communicated with an accumulator conduit line 42 via a check valve 41. To the accumulator conduit line 42, connected are an accumulator 43, a relief valve 44, and an conduit line 45 to an actuator (not shown) to which regenerative energy is supplied.

Next, the operation of the third embodiment will be explained. When the working vehicle travels by inertia on a slope, or reduces the speed by operating a brake, if an operation command is inputted into the operating element 30b of the emergency valve 30, the emergency valve 30 is switched to the F position. Thereby, the assisting conduit line 12 is cut off, then the input port 13a of the assisting motor 13 is connected to the tank 14 via the conduit line 31, and the output port 13b of the assisting motor 13 is connected to the accumulator valve 40 via the conduit lines 32 and 34.

In this situation, if an operation command is inputted to the operating element 40b of the accumulator valve 40, the accumulator valve 40 is switched to the H position, and thereby the conduit line 34 is connected to the accumulator conduit line 42 via the check valve 41. The assisting motor 13 then works as a regenerating pump. The assisting motor 13 absorbs tank oil from the input port 13a via the tank 14, the emergency valve 30, and the conduit line 31, and discharges pressurized oil from the output port 13b. The discharge pressurized oil is supplied to the accumulator 43 via the conduit lines 32 and 32, the accumulator valve 40 and the accumulator conduit line 42, thus accumulating energy in the accumulator 43. At the same time, it becomes possible to operate the actuator (not shown) connected to the conduit line 45. If the pressure inside the accumulator conduit line 42 becomes not less than a predetermined pressure, the excess pressure is relieved by the relief valve 44, thereby maintaining the pressure of accumulated pressurized oil at a predetermined value.

When an operation command is not inputted to the operating element 40b of the accumulator valve 40, the accumulator valve 40 is switched to the position G, and the conduit line 34 is connected to the steering valve 23 via the emergency conduit line 33.

According to the third embodiment as above, when the vehicle speed is not lower than the vehicle speed Va, the output torque of the assisting motor 13 rotated by the assisting pump 4 is added to the traveling motor 5, therefore enabling the working vehicle to travel at a high speed. Further, when the vehicle travels by inertia on a slop, or when a brake is operated, kinetic energy of the working vehicle is regenerated as hydraulic energy to be accumulated, and the accumulated energy can be utilized as a hydraulic source for the other devices, thereby making it possible to construct an energy-saving working vehicle. In addition, when the steering pump 21 or the like is out of order as in the second embodiment, the assisting motor 13 can be operated as a steering pump, therefore making it possible to facilitate a steering operation under emergency conditions.

What is claimed is:

1. A travel assisting hydraulic circuit for a hydraulic drive type working vehicle, which includes a traveling HST circuit having a traveling pump driven by the power of an engine and a traveling motor driven by pressurized oil from said traveling pump, with the output torque of said traveling motor being transmitted to a drive wheel via a traveling motor output shaft and via a speed reducer, said traveling assisting hydraulic circuit comprising:

an assisting pump driven by the power of said engine, which is another pump that is not specifically for traveling; and an assisting motor, which is provided at said speed reducer with said traveling motor, for outputting torque generated by being driven by the pressurized oil from said assisting pump to said speed reducer via an assisting motor output shaft and adding the torque to the output torque from said traveling motors, wherein said traveling HST circuit is independent from the hydraulic circuit which comprises said assisting pump and said assisting motor.

2. The travel assisting hydraulic circuit for the hydraulic drive type working vehicle in accordance with claim 1,
wherein said traveling HST circuit is an open circuit or a closed circuit.

3. The travel assisting hydraulic circuit for the hydraulic drive type working vehicle in accordance with claim 1,
wherein during inertia travel, or while a brake is operated, said assisting motor (13) is used as an energy regenerating pump.

4. The travel assisting hydraulic circuit for the hydraulic drive type working vehicle in accordance with claim 1,
wherein said assisting pump and said assisting motor are either a fixed displacement type or a variable displacement type.

5. The travel assisting hydraulic circuit for the hydraulic drive type working vehicle in accordance with claim 1, further comprising:

a steering cylinder (24) for driving steering; and a steering pump (21) for supplying pressurized oil to said steering cylinder (24), said assisting motor (13) being used as an alternative to said steering pump (21) either when said engine (1) stops, or when said steering pump (21) is out of order.

6. The travel assisting hydraulic circuit for the hydraulic drive type working vehicle in accordance with claim 3, further comprising:

a steering cylinder (24) for driving steering; and a steering pump (21) for supplying pressurized oil to said steering cylinder (24), said assisting motor (13) being used as an alternative to said steering pump (21) either when said engine (1) stops, or when said steering pump (21) is out of order.

7. The travel assisting hydraulic circuit for the hydraulic drive type working vehicle in accordance with claim 1, further comprising:

a vehicle speed detector for detecting the rotational frequency of said drive wheel as a vehicle speed;

a hydraulic detector for detecting the circuit pressure of said assisting motor;

an engine speed detector for detecting an engine speed of said engine; and a controller, said controller obtaining target circuit pressure relative to said detected engine speed of the engine when said detected vehicle speed is not lower than a predetermined assistance starting vehicle speed, and controlling an assisting quantity of said assisting motor so that said detected circuit pressure is equal to said target circuit pressure.

8. The travel assisting hydraulic circuit for the hydraulic drive type working vehicle in accordance with claim 3, further comprising:

a vehicle speed detector (7a) for detecting the rotational frequency of said drive wheel (8) as a vehicle speed (Va);

a hydraulic detector (12a) for detecting the circuit pressure of said assisting motor (13);

an engine speed detector (1a) for detecting an engine speed (Ne) of said engine (1); and a controller (20), said controller (20) obtaining target circuit pressure (Pt) relative to said detected engine speed (Ne) of the engine (1) when said detected vehicle speed (Va) is not lower than a predetermined assistance starting vehicle speed (Vset), and controlling an assisting quantity (qm) of said assisting motor (13) so that said detected circuit pressure is equal to said target circuit pressure (Pt).

9. The travel assisting hydraulic circuit for the hydraulic drive type working vehicle in accordance with claim 5, further comprising:

a vehicle speed detector (7a) for detecting the rotational frequency of said drive wheel (8) as a vehicle speed (Va);

a hydraulic detector (12a) for detecting the circuit pressure of said assisting motor (13);

an engine speed detector (1a) for detecting an engine speed (Ne) of said engine (1); and a controller (20), said controller (20) obtaining target circuit pressure (Pt) relative to said detected engine speed (Ne) of the engine (1) when said detected vehicle speed (Va) is not lower than a predetermined assistance starting vehicle speed (Vset), and controlling an assisting quantity (qm) of said assisting motor (13) so that said detected circuit pressure is equal to said target circuit pressure (Pt).

10. The travel assisting hydraulic circuit for the hydraulic drive type working vehicle in accordance with claim 6, further comprising:

a vehicle speed detector (7a) for detecting the rotational frequency of said drive wheel (8) as a vehicle speed (Va);

a hydraulic detector (12a) for detecting the circuit pressure of said assisting motor (13);

an engine speed detector (1a) for detecting an engine speed (Ne) of said engine (1); and a controller (20), said controller (20) obtaining target circuit pressure (Pt) relative to said detected engine speed (Ne) of the engine (1) when said detected vehicle speed (Va) is not lower than a predetermined assistance starting vehicle speed (Vset), and controlling an assisting quantity (qm) of said assisting motor (13) so that said detected circuit pressure is equal to said target circuit pressure (Pt).

* * * * *